United States Patent [19]
Sullivan

[11] Patent Number: 5,953,528
[45] Date of Patent: Sep. 14, 1999

[54] KNOWLEDGE OBJECT REGISTRATION

[75] Inventor: Anthony D. Sullivan, Richardson, Tex.

[73] Assignee: Electronic Data Systems Corporation, Plano, Tex.

[21] Appl. No.: 08/741,491

[22] Filed: Oct. 30, 1996

[51] Int. Cl.[6] .................................................. G06F 9/45
[52] U.S. Cl. .......................... 395/703; 395/705; 395/712; 707/501
[58] Field of Search .............................. 395/200.32, 683, 395/651, 183.14, 701, 702, 703, 705, 712; 706/52, 11; 707/100, 501

[56] References Cited

U.S. PATENT DOCUMENTS

| | | | |
|---|---|---|---|
| 4,752,889 | 6/1988 | Rappaport et al. | 706/11 |
| 5,265,206 | 11/1993 | Shackelford et al. | 395/683 |
| 5,361,350 | 11/1994 | Conner et al. | 707/103 |
| 5,652,884 | 7/1997 | Palevich | 395/651 |
| 5,708,825 | 1/1998 | Sttomayor | 707/501 |
| 5,787,245 | 7/1998 | You et al. | 395/183.14 |
| 5,787,431 | 7/1998 | Shaughnessy | 707/100 |
| 5,790,789 | 8/1998 | Suarez | 395/200.32 |
| 5,809,493 | 9/1998 | Ahamed et al. | 706/52 |

FOREIGN PATENT DOCUMENTS 0 334 113 A2   9/1989   European Pat. Off. .......... G06F 9/44

OTHER PUBLICATIONS

Proceedings of the Conference on Computer–Supported Cooperative Work, Los Angeles, CA, USA, Oct. 7–10, 1990, pp. 143–156, Engelbart D.C., entitled "Knowledge–Domain Interoperability and an Open Hyperdocument System".

Ralf Moller, "A functional layer for description logics: Knowledge representation meets object oriented programming", OOPSLA '96 ACM pp. 198–213, 1996.

Vanderdonckt & Bodart, "Encapsulating knowledge for intelligent automatic interaction objects selection", INTER-CHI 93, ACM pp. 424–429, Apr. 1993.

*Primary Examiner*—Tariq R. Hafiz
*Assistant Examiner*—Anil Khatri
*Attorney, Agent, or Firm*—L. Joy Griebenow; Baker & Botts L.L.P.

[57] ABSTRACT

A system (10) for registering a knowledge object (22) includes a server (12) and a client (14). The server (12) receives a request (38) from the client (14) to register the knowledge object (22). In response, the server (12) stores a trust stamp (46) and an envelope (50), and delivers a pointer (56) to the client (14).

20 Claims, 7 Drawing Sheets

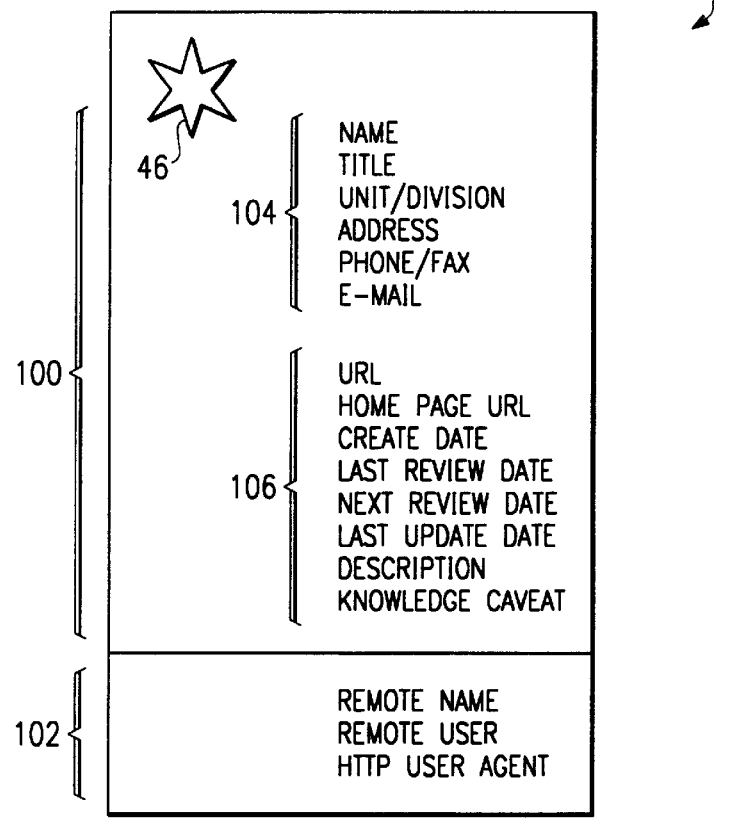

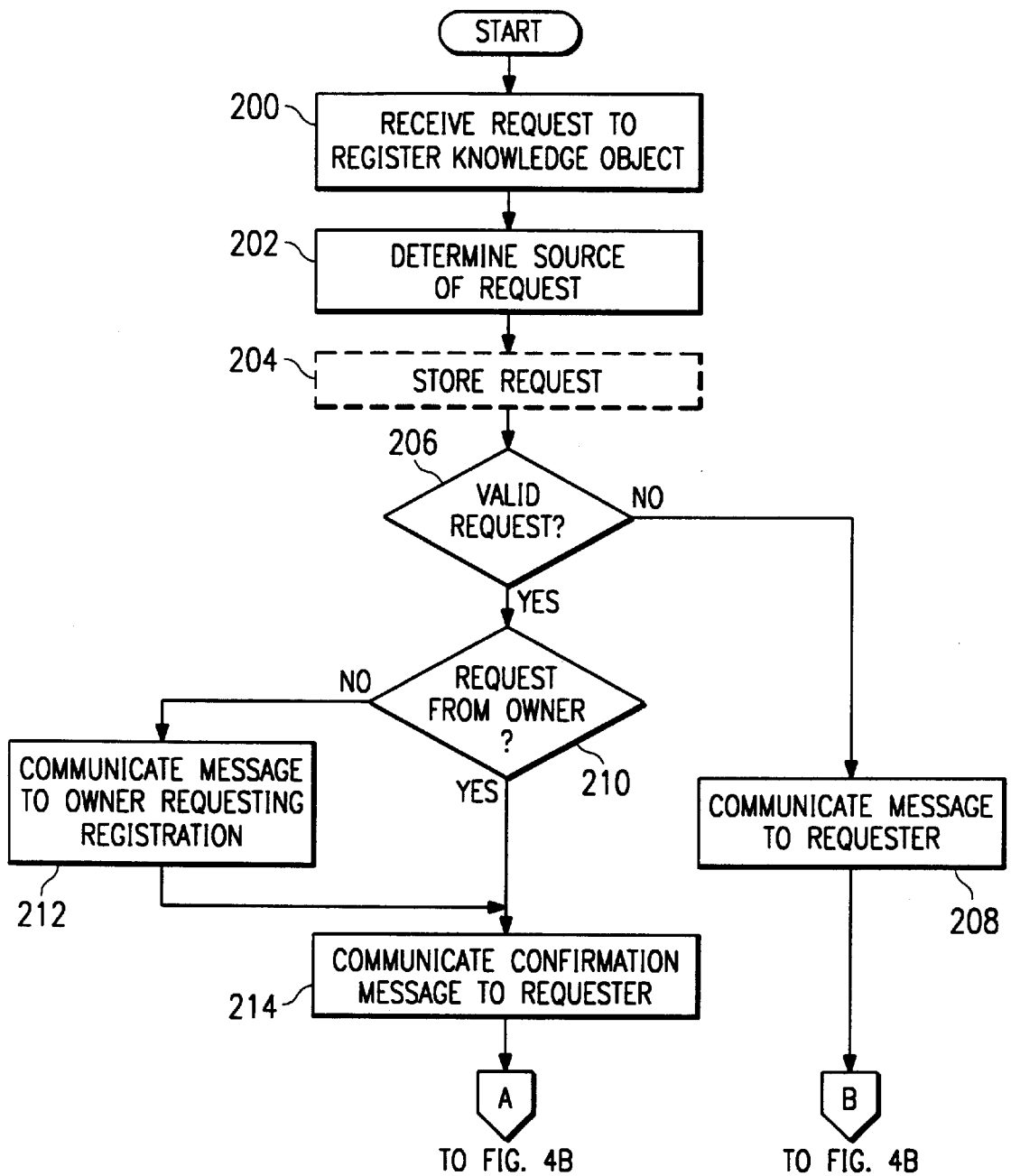

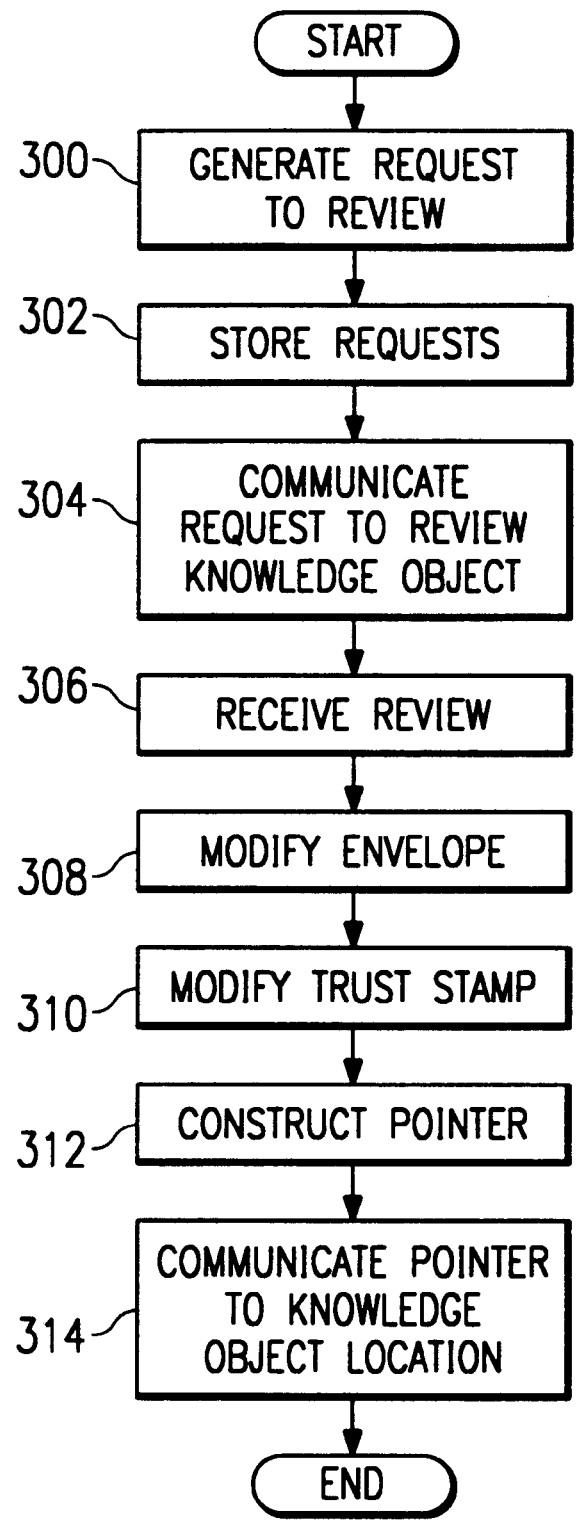

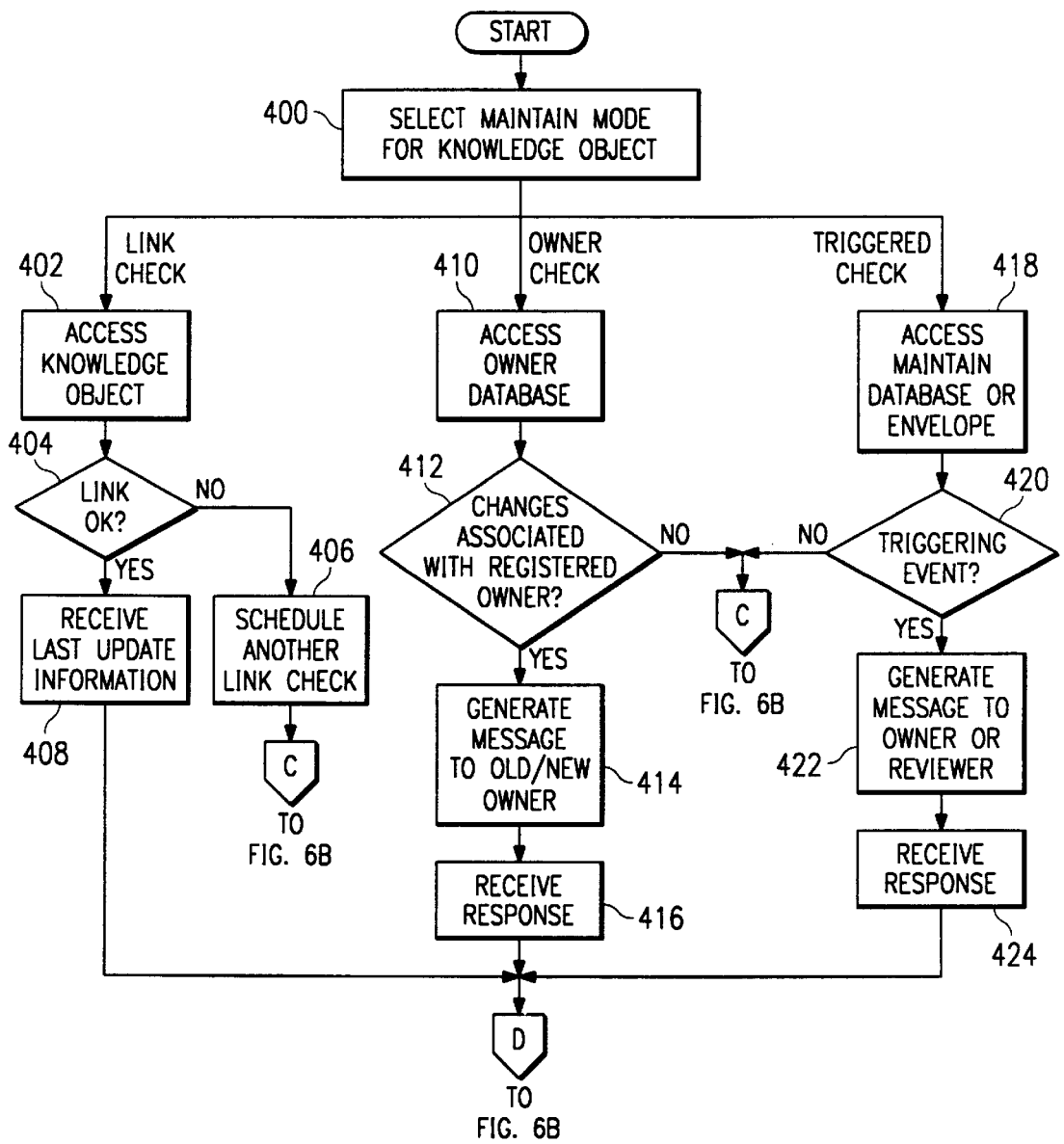

KNOWLEDGE OBJECT REGISTRATION

TECHNICAL FIELD OF THE INVENTION

This invention relates in general to the field of knowledge management, and more particularly to a system and method for knowledge object registration.

BACKGROUND OF THE INVENTION

Many people use information or knowledge as part of their function within a business or other organization. These knowledge workers acquire information from multiple sources, and use this information in relation to some business activity to generate value to the corporation or entity. As available information sources become larger and more complex to serve a variety of knowledge workers, the task to identify and retrieve significant and meaningful information becomes more difficult. This flood of information presents a challenge to provide information to the user that is valid and useful in the knowledge worker's activities.

Knowledge workers may spend significant time looking for the applicable information in the form of data or processes to achieve their business purpose. Once locating the appropriate data or process, the knowledge workers spend additional time validating and reformatting the information to meet the current need. Because the primary input to the knowledge worker task is information, work quality depends on access to high quality sources of relevant information. Likewise, worker productivity depends upon minimization of information search and validation.

Since most knowledge workers have a limited amount of time to complete an assigned task, the difficulty in obtaining valid and useful information places a further constraint on the time available and, in some cases, causes vital information to be overlooked. Similarly, too much information or data overload may exacerbate the situation. Existing systems that collect, manage, and categorize information may not ensure the validity and usefulness of information for the knowledge worker.

SUMMARY OF THE INVENTION

In accordance with the present invention, the disadvantages and problems associated with systems and methods for identifying and validating information have been substantially reduced or eliminated.

In accordance with one embodiment of the present invention, an apparatus for registering a knowledge object includes a first memory that stores a trust stamp specifying one of a plurality of levels of confidence in the object. A second memory stores an envelope specifying a location of the object. A construct module is coupled to the first memory and the second memory and generates a pointer for delivery to the location of the object. The pointer includes a first address specifying the trust stamp and a second address specifying the envelope.

Important technical advantages of the present invention include a system and method for registering and maintaining information on the trust, confidence, or validity of a knowledge object. This is accomplished through a registration procedure for a knowledge object that establishes a level of confidence in the object. Each time a knowledge worker accesses the object, the system displays visually the level of confidence or trust stamping associated with the object. Furthermore, a knowledge envelope associated with each registered object specifies the level of confidence, ownership information, creation and review dates, knowledge caveats, and other information concerning the registration of the object.

Further technical advantages of the present invention include several mechanisms to maintain, review, and update the trust stamping of a knowledge object. For example, the system may periodically access the object to verify its continued existence and viability. The system may also use object owner information or responses to verify that the knowledge object is current and worthy of its existing confidence level or trust stamping. Moreover, the system may incorporate a variety of triggering events to ensure proper knowledge object registration.

In a particular embodiment, knowledge object registration is performed in a client/server environment, in which clients store knowledge objects for registration by the server. The server receives requests for registration of an object from a variety of sources and generates a pointer for inclusion in the knowledge object stored on the client that provides links to a trust stamp and envelope stored at the server and associated with the knowledge object. In a more particular embodiment, the knowledge object, trust stamp, and envelope each comprise hypertext mark-up language (HTML) associated with a uniform research locator (URL) address. Other technical advantages are readily apparent to one skilled in the art from the following figures, descriptions and claims.

BRIEF DESCRIPTION OF THE DRAWINGS

For a more complete understanding of the present invention and for further features and advantages, reference is now made to the following description taken in conjunction with the accompanying drawings, in which:

FIG. 2 illustrates the contents of an exemplary envelope associated with a knowledge object;

FIG. 3 illustrates the contents of an exemplary pointer associated with a knowledge object;

FIGS. 4A and 4B are a flowchart of a method for registering a knowledge object according to the present invention;

FIG. 5 is a flowchart of a method for reviewing the registration of a knowledge object; and FIGS. 6A and 6B are a flowchart of a method for maintaining the registration of a knowledge object.

DETAILED DESCRIPTION OF THE INVENTION

Figure 1:
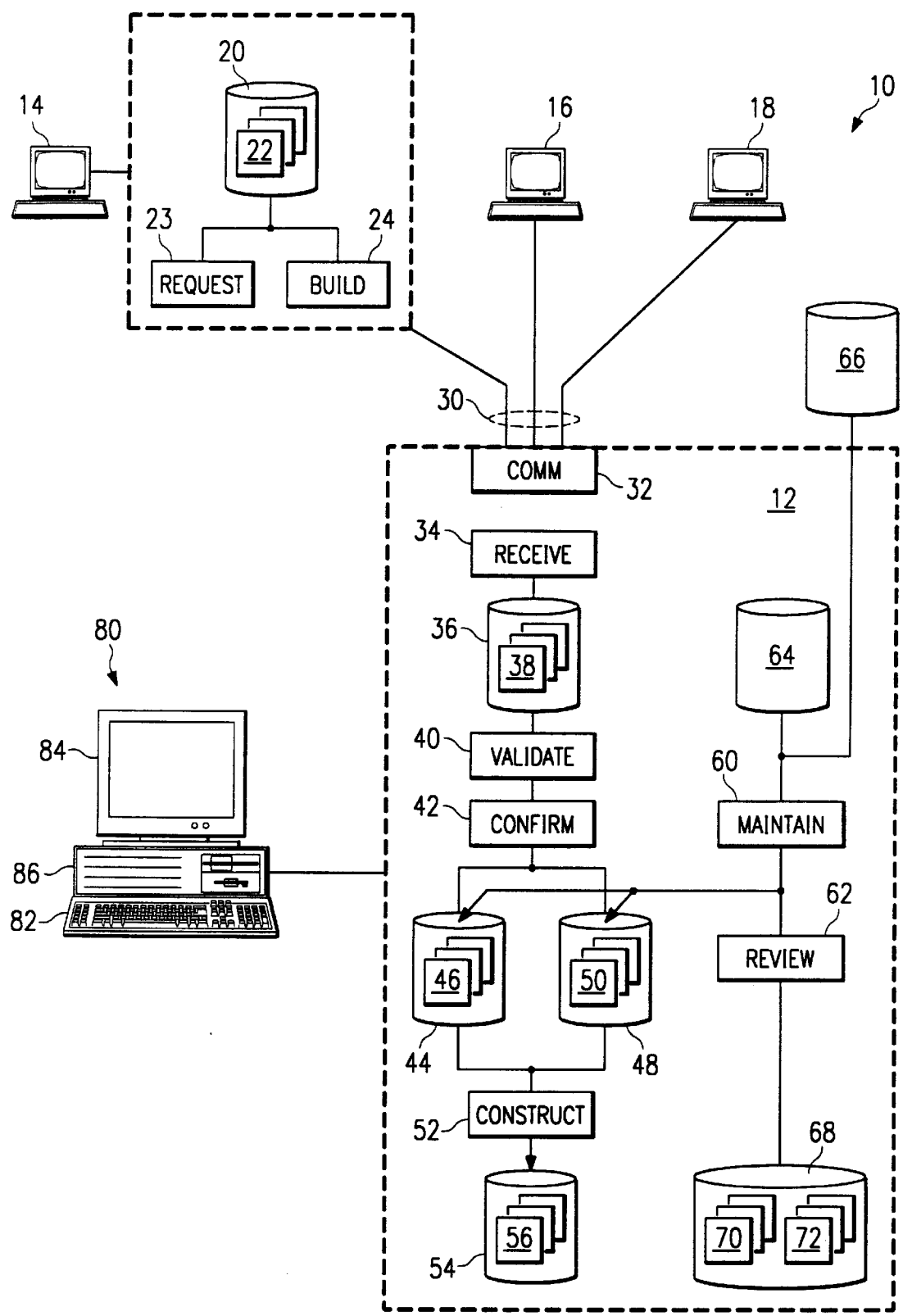
FIG. 1 illustrates a system for registering a knowledge object according to the present invention.

FIG. 1 illustrates a system 10 for registering a knowledge object according to the present invention. Generally, a knowledge object can be any data, process, or other compilation of information useful to a knowledge worker in performing tasks for a business or organization. In general, system 10 identifies the location of knowledge objects, receives requests to register these objects, registers the objects using specific criteria, and maintains and updates knowledge object registrations to ensure the validity and usefulness of knowledge objects.

System 10 operates on the concept of "trust" in knowledge objects. Often, knowledge workers may perform research, modification, and monitoring of data and processes before conducting a business task. Data and processes are said to be trusted if they can be used with a degree of confidence without further research, modification, or monitoring. The classifications of trust or levels of confidence provide metrics that specify the appropriate scope of work and the degree of certitude of the business task. Trust stamping provides visible and textual assurances that the worker may proceed immediately, relying on the data or process as being correct for the intended use.

The concept of trust is based on the premise that intellectual capital items can be classified according to their integrity, reliability, timeliness, and applicability. A corporate collective memory attached to the knowledge object allows continuous verification and improvement through feedback. The trust concept is analogous to security practices that measure the hard and soft assets of systems as to their resistance to corruption and provide a range of ranking as guides to information reliability. The "trusted knowledge base" as developed and maintained on system 10 provides levels of confidence in the exercise and use of information.

The registration process in system 10 relies on the concept of "ownership" of knowledge objects. Knowledge object owners can identify the object to register, provide a set of conditions under which a confidence level applies, monitor usage and feedback of the object, and maintain the currency of the object. Once the knowledge object receives a trust rating, it has a trust stamp appended to its presentation. The trust stamp is a visual mechanism that provides a worker with feedback to obviate the need to do additional validation and research. A link associated with the trust stamp provides additional information regarding the item stored in a knowledge object envelope.

Referring again to FIG. 1, system 10 includes a server 12 coupled to a variety of clients 14, 16, and 18, referred to generally in the singular as client 14 or in the plural as clients 14. Client 14 comprises a memory or database 20 for storing one or more knowledge objects 22, a request module 23, and a build module 24. Clients 16 and 18 may include similar components as client 14. The owner of knowledge object 22 may be associated with or have access to client 14 as a local owner or client 16 as a remote owner. A reviewer may be associated with client 18 to provide a review or other information on knowledge object 22 registered and maintained by system 10. Although FIG. 1 illustrates only one client 14 storing knowledge objects 22, system 10 contemplates many clients 14 of any suitable design and at any suitable location to store knowledge objects 22.

Clients 14 communicate with server 12 using hardware and software associated with link 30. Link 30 may be a dedicated or switched link over the public switched telephone network (PSTN), a satellite link, a microwave link, or other appropriate communication link between clients 14 and server 12. The components of system 10 may be part of a local area network (LAN), wide area network (WAN), or any other suitable network of interconnected computing devices. In a particular embodiment, components in system 10 communicate over the Internet using the World Wide Web (WWW), file transfer protocol (FTP), Telnet, Usenet, Gopher or Archie utility, electronic mail, bulletin boards, or other communication technique. For example, server 12 and clients 14 may maintain and execute a browser or other suitable program for accessing and communicating information addressed by a uniform resource locator (URL) using link 30.

Although server 12 and clients 14 are referred to in the nomenclature of a client/server environment, it should be understood that server 12 and clients 14 may be any type of computer operating in any suitable environment that communicate using communication link 30. For example, the components in system 10 may be arranged in a peer-to-peer computing environment.

In addition to the communication hardware and software described above, components in system 10 include memory devices such as database 20 that store information such as knowledge objects 22. Throughout this description, the storage, communication, and access to knowledge objects 22 may be performed using any format, structure, or arrangement of information that includes machine-readable or user-readable text. In a particular embodiment, knowledge objects 22 comprise information accessible over a global computer network such as the Internet written in hypertext mark-up language (HTML), HTML+, standard generalized mark-up language (SGML), virtual reality mark-up language (VRML), or any other appropriate content development language. Knowledge objects 22 may also include program code, such as applets written in JAVA developed by SUN MICROSYSTEMS, or other appropriate self-executing code.

Server 12 includes a communication module 32 coupled to communication link 30 that supports communication between client 14 and the various components of server 12. A receive module 34 is coupled to a request database 36 which stores a request 38 to register knowledge object 22 received from client 14. Request database 36 is coupled to validate module 40, which is in turn coupled to confirm module 42.

A trust stamp database 44 is coupled to confirm module 42 and stores a number of trust stamps 46 associated with registered knowledge objects 22. Confirm module 42 is also coupled to an envelope database 48 which stores a number of envelopes 50 associated with registered knowledge objects 22. Trust stamp database 44 and envelope database 48 are coupled to construct module 52, which in turn is coupled to pointer database 54 for storing pointers 56 for communication to clients 14 maintaining knowledge objects 22.

Server 12 also includes a maintain module 60 and a review module 62 operable to access and modify trust stamps 46 maintained in trust stamp database 44 and envelopes 50 maintained in envelope database 48. Maintain module 60 is coupled to maintain database 64 and owner database 66, which may be maintained external to server 12. Review module 62 is coupled to review database 68 which stores requests 70 for delivery to client 18 and reviews 72 received from client 18.

Server 12 and clients 14 may operate on one or more computers, such as computer 80 associated with server 12. Each computer 80 includes an input device 82 such as a keypad, touch screen, mouse, or other device that can accept information. Output device 84 conveys information associated with the operation of server 12 or clients 14, including digital data, visual information, or audio information. Both input device 82 and output device 84 may include fixed or movable storage media such as a magnetic computer disk, CD-ROM, or other suitable media to both receive output from and provide input to server 12 and clients 14. Processor 86 and its associated memory execute instructions and manipulate information in accordance with the operation of system 10.

Computer 80 associated with server 12 maintains and executes the instructions to implement communication module 32, receive module 34, validate module 40, confirm module 42, construct module 52, maintain module 60, and review module 62. Computer 80 associated with client 14 maintains and executes the instructions to implement request module 23 and build module 24. Each module described above with reference to server 12 and client 14 comprises any suitable combination of hardware and software in computer 80 to provide the described function or operation of the module. For example, modules may include program instructions and associated memory and processing components to execute the program instructions. Also, modules illustrated in FIG. 1 may be separate from or integral to other modules.

Request database 36, trust stamp database 44, envelope database 48, pointer database 54, maintain database 64, owner database 66, and review database 68 on server 12 may comprise one or more files, lists, or other arrangement of information stored in one or more components of random access memory (RAM), read only memory (ROM), magnetic computer disk, CD-ROM, other magnetic or optical storage media, or any other volatile or non-volatile memory. Similarly, knowledge object database 20 maintained on any number of clients 14 may also comprise any of the storage arrangement listed above with reference to server 12. Also, although FIG. 1 illustrates most databases as internal to server 12 or client 14, it should be understood that databases may be internal or external to components of system 10, depending on the particular implementation. Also, databases illustrated in FIG. 1 may be separate or integral to other databases.

In operation, system 10 allows for the registration, review, and maintenance of knowledge object 22 stored at client 14. To register knowledge object 22, client 14 either automatically or as a result of user intervention, generates request 38 to register knowledge object 22 using request module 23. Client 14 communicates request 38 using communication link 30, which is received by server 12 at communication module 32. Request 38 is passed to receive module 34, which specifies information identifying the source of request 38. For example, receive module 34 may specify the node, network address, or other identifier of client 14 submitting request 38. Request database 36 then stores request 38 that includes a first portion generated by client 14 and a second portion identifying the source of request 38. The optional use of request database 36 provides a batch processing capability to server 12 for processing requests 38 received from client 14.

Either upon receipt of request 38 at client 12 or during batch processing, validate module 40 accesses request 38 stored in request database 36 and analyzes the contents of request 38 to ensure that request 38 contains all desired information to determine whether knowledge object 22 is a process or data item. Validate module 40 also determines if knowledge object 22 is associated with a local owner at client 14 or a remote owner at client 16. For example, client 14 may store knowledge object 22 and may also be associated with a local owner of knowledge object 22. However, client 14 may submit request 38, but a remote owner of knowledge object 22 may be associated with client 16. In this case, validate module 40 generates a message for delivery to client 16 informing the remote owner that registration has been requested on knowledge object 22, and requesting confirmation that registration is appropriate. In either case, confirm module 42 generates a message for delivery to client 14 to indicate that server 12 received request 38 to register knowledge object 22.

Envelope database 48 stores envelope 50 associated with knowledge object 22. Envelope 50 contains the first portion of request 38 specified by client 14 and the second portion of request 38 specified by receive module 34. FIG. 2 illustrates in more detail the contents of envelope 50. Trust stamp database 44 stores trust stamp 46 associated with knowledge object 22. Trust stamp 46 specifies the desired level of confidence for registration of knowledge object 22.

Server 12 maintains levels of trust or confidence of knowledge object 22. Each level of trust may correspond to a specific technique for registration and conveys to the user the level of confidence in knowledge object 22. In a particular embodiment, each level of confidence is associated with a color and an identifiable graphical stamp that is eventually appended, included, affixed, or associated with knowledge object 22. One example of a specific rating scheme includes gold knowledge objects, silver knowledge objects, and registered knowledge objects. System 10 may incorporate any number of registration levels for knowledge object 22.

A gold knowledge object contains particularly reliable information that is, for example, corporate-wide and useful for any business purpose within the corporate organization. System 10 tightly monitors the credibility of gold knowledge objects, and may require a review process before final designation as a gold knowledge object. In the interim, a request to register knowledge object 22 as gold may generate a gold pending trust stamp 46 in trust stamp database 44 while a reviewer associated with client 18 performs additional review on knowledge object 22. Typical gold knowledge objects may include annual reports, corporate-wide policy guidelines, audited financial information, and other information that is used and trusted throughout the business organization or entity.

A silver knowledge object may be subject to the same scrutiny and credibility monitoring, but applies to a limited use within the business organization or entity. For example, a silver knowledge object may apply to the domestic United States, to a specific division of a company, or to a particular customer or project. The silver knowledge object may also include a knowledge caveat that identifies appropriate areas of use, potential improper uses, or cautions as to the content and credibility of the information. For example, the knowledge caveat may indicate that the silver knowledge object applies with guaranteed validity and credibility to business activities in the domestic United States, but not to business activities in foreign countries. As server 12 receives additional feedback on the applicability and validity of a silver knowledge object within the business organization, it may eventually be upgraded to gold status. In a particular embodiment the silver knowledge object, like the gold knowledge object, may initially carry a pending silver status awaiting further review by a reviewer associated with client 18.

A registered knowledge object may be associated with another appropriate color, such as bronze, and indicates that the information in registered knowledge object is subject to monitoring and verification. Registered knowledge objects may be useful within a business organization since a knowledge object owner confirms the validity and credibility of the registered knowledge object. Moreover, server 12 accesses, reviews, and monitors registered knowledge objects to verify a continued high quality and confidence in their content and currency.

In a particular embodiment, trust stamp database 44 and envelope database 48 store information at particular locations or addresses that allow retrieval of trust stamp 46 and envelope 50 by specifying their associated addresses. For example, trust stamp 46 and envelope 50 may have associated URLs that allow clients 14 access to this information over communication link 30. Construct module 52 uses this addressing information to generate pointer 56 associated with knowledge object 22 for storage in pointer database 54. The structure and contents of pointer 56 are discussed in more detail with reference to FIG. 3.

Communication module 32 accesses pointer database 54 and communicates pointer 56 to client 14 using communication link 30. Client 14 receives pointer 56 at build module 24, which appends, includes, affixes, or otherwise associates pointer 56 with knowledge object 22. In a particular embodiment, build module 24 may represent or cause execution of a self-executing program delivered with pointer 56 to client 14. For example, client 14 may retrieve pointer 56 as an applet written in JAVA developed by SUN MICROSYSTEMS to automatically insert itself into the appropriate location in knowledge object 22. In an alternative embodiment, client 14 receives pointer 56 as an attachment to an electronic mail message, as an FTP transfer, or through some other communication technique and the user of client 14 manually inserts this information into knowledge object 22.

Pointer 56 now residing within knowledge object 22 provides linking to its associated trust stamp 46 and envelope 50 maintained at server 12. In this manner, knowledge object 22 does not store its trust stamp 46 or envelope 50 but includes links to this information maintained at server 12. Therefore, server 12 can modify trust stamp 46 and envelope 50 using a variety of mechanisms, and these modifications will be reflected as knowledge workers access knowledge object 22. This centralized maintenance of trust stamps 46 and envelopes 50 provide ease of maintenance and review, security, and overall integrity of system 10.

The operation of maintain module 60 and review module 62 illustrates the advantages of this centralized architecture. Maintain module 60 performs several functions to ensure the proper registration of knowledge object 22. For example, maintain module 60, using communication module 32 and communication link 30, periodically accesses knowledge objects 22 at client 14 to ensure the proper operation of communication link 30 and clients 14 and to confirm the existence and continued viability of knowledge object 22, URL address, and its last update. Maintain module 60 also accesses feedback information stored in maintain database 64 to reevaluate the registration of knowledge object 22. For example, feedback information from users may indicate the degree to which knowledge object 22 is useful, appropriate, accurate, or valid with respect to its current trust stamp 46 and envelope 50. Moreover, maintain module 60 includes a clock or timer to cause generation of a confirmation message for delivery to an owner of knowledge object 22 upon expiration of a predetermined period of time. For example, maintain module 60 may trigger periodic reviews every six months to ensure continued proper registration of knowledge object 22.

Maintain module 60 may also access owner database 66 to retrieve the location, employment status, or other information on the owner of knowledge object 22. Server 12 uses this owner information to reassess or review whether knowledge object 22 continues to receive attention and maintenance from its associated owner. For example, owner database 66 may comprise a corporate directory that includes the name, electronic mail address, physical location, organization, URL address, network node address, and other information on each of its employees. As owner database 66 is updated, maintain module 60 accesses change records to retrieve modified information on owners identified in envelopes 50 stored in envelope database 48. When information on an owner of knowledge object 22 changes, maintain module 60 generates a message to the owner requesting confirmation that the knowledge object 22 maintain its registration. Maintain module 60 may also generate a message for delivery to the old owner or previously known location of knowledge object 22 to receive a similar confirmation. If the owner with changed information reflected in owner database 66 maintains a number of knowledge objects 22, the message generated by maintain module 60 may include a list of knowledge objects 22 and their associated URLs. In response to accessing knowledge object 22, accessing maintain database 64, or accessing owner database 66, maintain module 60 may update, add, delete, or modify trust stamps 46 stored in trust stamp database 44 and envelopes 50 stored in envelope database 48.

Review module 62 constructs request 70 for delivery to a reviewer associated with client 18 using communication module 32 and communication link 30. Server 12 generates request 70 upon, for example, a request for gold trust stamping that requires review by one or more persons at a particular level in the organization. In addition, review module 62 may generate request 70 in response to a message from maintain module 60 requesting review of knowledge object 22 because of, for example, information collected in maintain database 64. The reviewer associated with client 18 manually or automatically generates review 72 for communication to server 12 and storage in review database 68. Review module 62 retrieves review 72 stored in review database 68 and modifies trust stamps 46 and envelopes 50 accordingly.

FIG. 2 illustrates envelope 50 maintained in envelope database 48. A knowledge worker accessing knowledge object 22 may request to view the contents of envelope 50 by selecting a graphical representation of trust stamp 46 inserted into knowledge object 22 by build module 24 in response to this request. As discussed below with reference to FIG. 3, the display of a graphical representation of trust stamp 46 with knowledge object 22 may be accomplished by including linking language in pointer 56 that refers to a source file image of trust stamp 46 maintained in trust stamp database 44. Upon selecting the graphical representation of trust stamp 46, the knowledge worker views the information shown in FIG. 2.

Envelope 50 includes a graphical representation of trust stamp 46, similar or identical to the graphical representation of trust stamp 46 presented with knowledge object 22. The display of trust stamp 46 within envelope 50 may be accomplished by including linking language that graphically displays the image source file maintained in trust stamp 44 while the user views envelope 50. There may also be instructions that cause the background upon which information in envelope 50 is displayed to be a particular color associated with the registration level of knowledge object 22. Both the graphical representation of trust stamp 46 and the background color convey to the user the registration level of knowledge object 22.

Envelope 50 includes a first portion 100 derived from request 38 generated at client 14 and a second portion 102 specified by receive module 34 in response to establishing communication between server 12 and client 14. The first portion 100 includes owner information 104 and knowledge object information 106. For example, owner information 104 may include the name, title, unit/division, address, phone number, fax number, electronic mail address, or other information associated with or identifying the owner of knowledge object 22. Knowledge object information 106 includes a URL or other address of knowledge object 22, and optionally a URL or other address associated with a home page for knowledge object 22. In addition, knowledge object information 106 includes specific dates, such as a create date, last review date, and next review date, that may be used by maintain module 60 to schedule reviews of knowledge object 22. Knowledge object information 106 may also include a description of the information and, if appropriate, a knowledge caveat that specifies suggestions and limits on the use of information contained in knowledge object 22.

Receive module 34 may automatically generate second information 102 in envelope 50 in response to a communication between server 12 and client 14. This information may include a network node, remote name, a remote user, an identification of hypertext transfer protocol (HTTP) user agents, or other information that specifies the location or address of client 14 in a network supported by communication link 30.

FIG. 3 illustrates a specific pointer 56 for insertion into knowledge object 22. Although the specific content and structure of pointer 56 corresponds to an HTML or an Internet-based implementation of the invention, one can appreciate that any appropriate linking or addressing may be used to ensure that pointer 56 relates back to addresses or locations of trust stamp 46 and envelope 50 stored at server 12. In this particular implementation, pointer 56 includes an "HREF" statement 150 with a URL address 152 that specifies the location of envelope 50 stored in envelope database 48. Pointer 56 also includes an image source statement 154 having a URL address 156 that specifies the location of trust stamp 46 stored in trust stamp database 44. Pointer 56 also includes a number of graphic statements 158 to produce a graphical representation of trust stamp 46 for inclusion in knowledge object 22.

In operation, build module 24 inserts pointer 56 into knowledge object 22 automatically using self-executing code, such as an applet written in JAVA developed by SUN MICROSYSTEMS. When a knowledge worker accesses knowledge object 22, the access program, such as a browser, encounters pointer 56 and displays the graphical representation of trust stamp 46 using source statement 154 and associated graphical statements 158. The knowledge worker can select the graphical representation of trust stamp 46 to access additional information on the registration of knowledge object 22 stored in envelope 50. For example, a knowledge worker can click on the graphical representation of trust stamp 46 to execute "HREF" statement 150 and display the contents of envelope 50 associated with knowledge object 22.

It should be understood that the contents of FIG. 3 represent a particular implementation of pointer 56 in an HTML or other markup or scripting environment. Such an environment supports access or linking to various sources of information in system 10 using URL addresses. However, the present invention contemplates any other constructional form of pointer 56 that allows a reference, linking, or addressing back to trust stamp 46 and envelope 50 stored at server 12. Moreover, this technique applies to any computing environment or network of computing devices in a client/server arrangement, peer-to-peer organization, or other suitable organization that supports communication among different components in system 10.

Figure 4B:
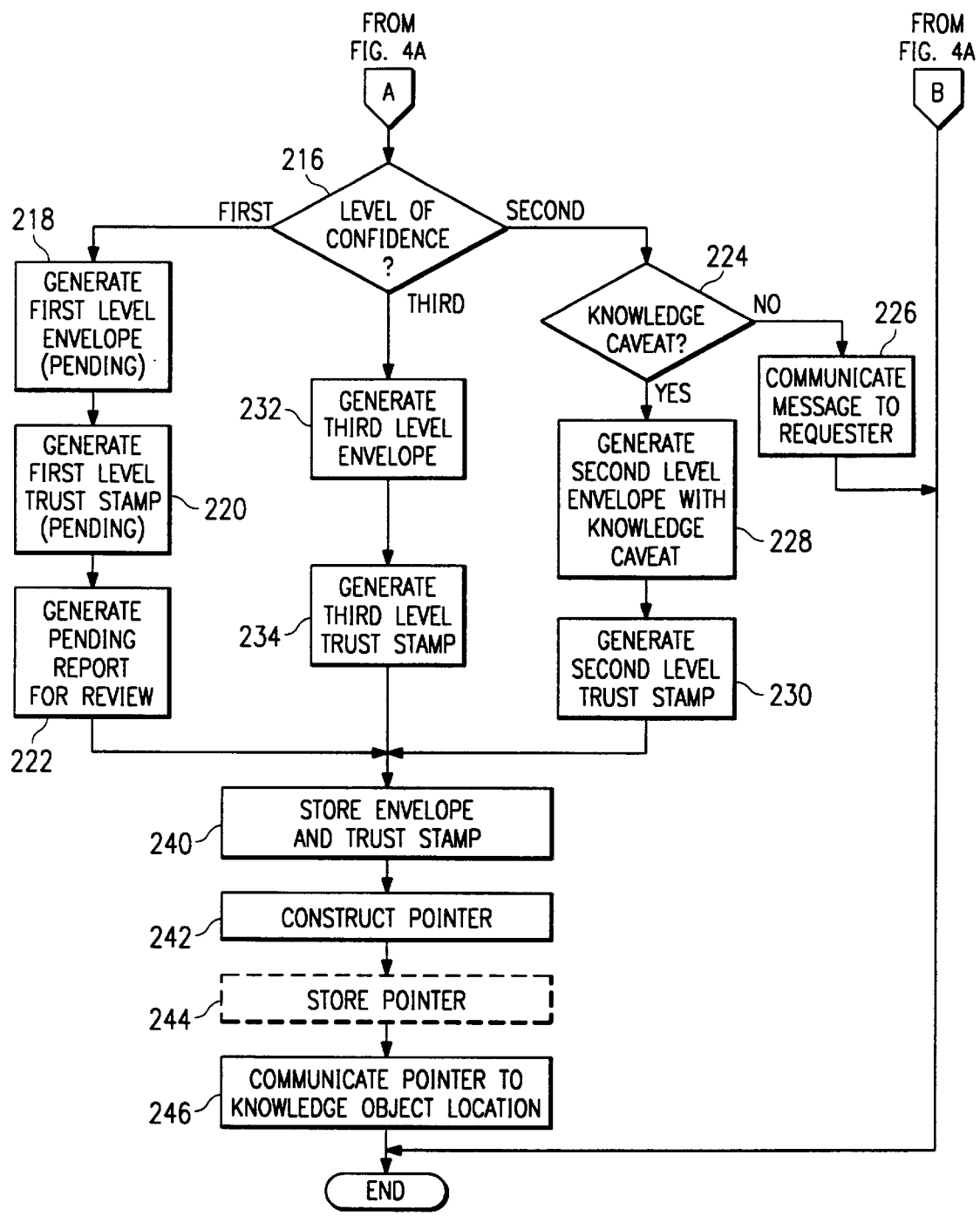

FIGS. 4A and 4B are a flowchart of a method of operation of server 12 to register knowledge object 22 in system 10. The method begins at step 200 where server 12 receives request 38 to register knowledge object 22 using communication link 30 and communication module 32. Receive module 34 determines the source of request 38 at step 202, and specifies second portion 102 to eventually be stored in envelope 50 associated with knowledge object 22. Server 12 may store request 38 in request database 36 for later batch processing at step 204. Server 12 need not implement a request database 36, and in such case step 204 may be eliminated.

Server 12 next determines if request 38 is a valid request at step 206. For example, validate module 40 may verify that a requester properly completed the required fields in a request form. Also, validate module 40 may determine if server 12 authorizes requests for registration from this particular client 14. If there is a problem with the content of request 38 or the source of the requester, server 12 communicates a message to client 14 at step 208.

If request 38 is not received from the owner at step 210, then server 12 communicates a message to the owner identified in request 38 asking for confirmation to register knowledge object 22. For example, client 14 may generate request 38 to register knowledge object 22 and specify a remote owner associated with client 16. In such a case, server 12 generates a message for delivery to client 16 requesting confirmation of registration. Whether request 38 originates from the owner of knowledge object 22 or not, server 12 communicates a confirmation message to client 14 using confirm module 42 at step 214.

Server 12 determines the level of confidence desired for knowledge object 22 at step 216. The level of confidence may be determined by server 12 using information contained in request 38. In this particular example, FIGS. 4A and 4B illustrate a three level of confidence registration procedure in which the first level corresponds to the highest level of confidence, the second level corresponds to the next highest level of confidence that includes a knowledge caveat, and the third level corresponds to a registered level. In a particular embodiment, the first level, second level, and third level may correspond to a gold, silver, and registered level.

If the level of confidence specified in request 38 is the first or highest level, the method proceeds to step 218 to generate a first level envelope 50 with a pending status. Server 12 then generates a first level trust stamp 46 marked as pending at step 220. In this embodiment, the first level of confidence requires additional review, so server 12 generates request 70 to store in review database 68 for eventual delivery to and review by client 18 at step 222.

If request 38 specifies the second level of confidence at step 216, server 12 determines if request 38 includes a knowledge caveat at step 224. If request 38 does not include a knowledge caveat at step 224 and server 12 requires a knowledge caveat for registering under the second level of confidence, server 12 communicates a message to the requester at step 226 identifying this deficiency. If request 38 includes a knowledge caveat, server 12 generates a second level envelope 50 with the knowledge caveat at step 228 and generates a second level trust stamp 46 at step 230.

If request 38 specifies no level of confidence or just requests registration of knowledge object 22 in system 10, server 12 generates a third level envelope 50 at step 232 and a third level trust stamp at step 234.

Upon processing a first, second, or third level request 38, server 12 stores associated envelope 50 in envelope database 48 and associated trust stamp 46 in trust stamp database 44 at step 240. Using the addresses or location of stored envelope 50 and stored trust stamp 46, construct module 52 constructs pointer 56 at step 242. Pointer 56 may be optionally stored in pointer database 54 at step 244. Server 12 then communicates pointer 56 to client 14 at step 246 for insertion into knowledge object 22 by build module 24.

FIG. 5 is a flowchart of a method of operation of server 12 to review an existing registration of knowledge object 22. The method begins at step 300 where server 12 generates a request to review. For example, review module 62 may generate a request to review at step 300 in response to an attempted registration of a high level of confidence, such as a gold level, that initially registers in a pending status. Server 12 contemplates any number of events generated by maintain module 60, review module 62, or other components of server 12 that prompts review of the current registration of knowledge object 22.

For each request to review, server 12 stores requests 70 in review database 68 at step 302. As a batch process, in real time, or using some other technique, server 12 communicates request 70 to the appropriate location for review at step 304. For example, server 12 may communicate request 70 to a qualified reviewer associated with client 18 at step 304. System 10 contemplates any appropriate owner, person, committee, or entity to be designated as a reviewer to assess the status of registered knowledge object 22 in system 10.

Upon a manual or automated review, server 12 receives and stores review 72 in review database 68 at step 306. Review module 62 then accesses review 72 and, in response, modifies an associated envelope 50 at step 308 and an associated trust stamp 46 at step 310. For example, if knowledge object 22 requested gold status, and review 72 confirmed registration as a gold knowledge object, review module 62 could modify trust stamp 46 and envelope 50 to indicate that knowledge object 22 has achieved gold registration. If necessary, server 12 may construct a new pointer 56 at step 312 and communicate pointer 56 to the location of knowledge object 22 at step 314. However, if pointer 56 inserted in knowledge object 22 maintains links to modified trust stamp 46 and envelope 50, a new pointer may not be necessary.

Figure 6B:
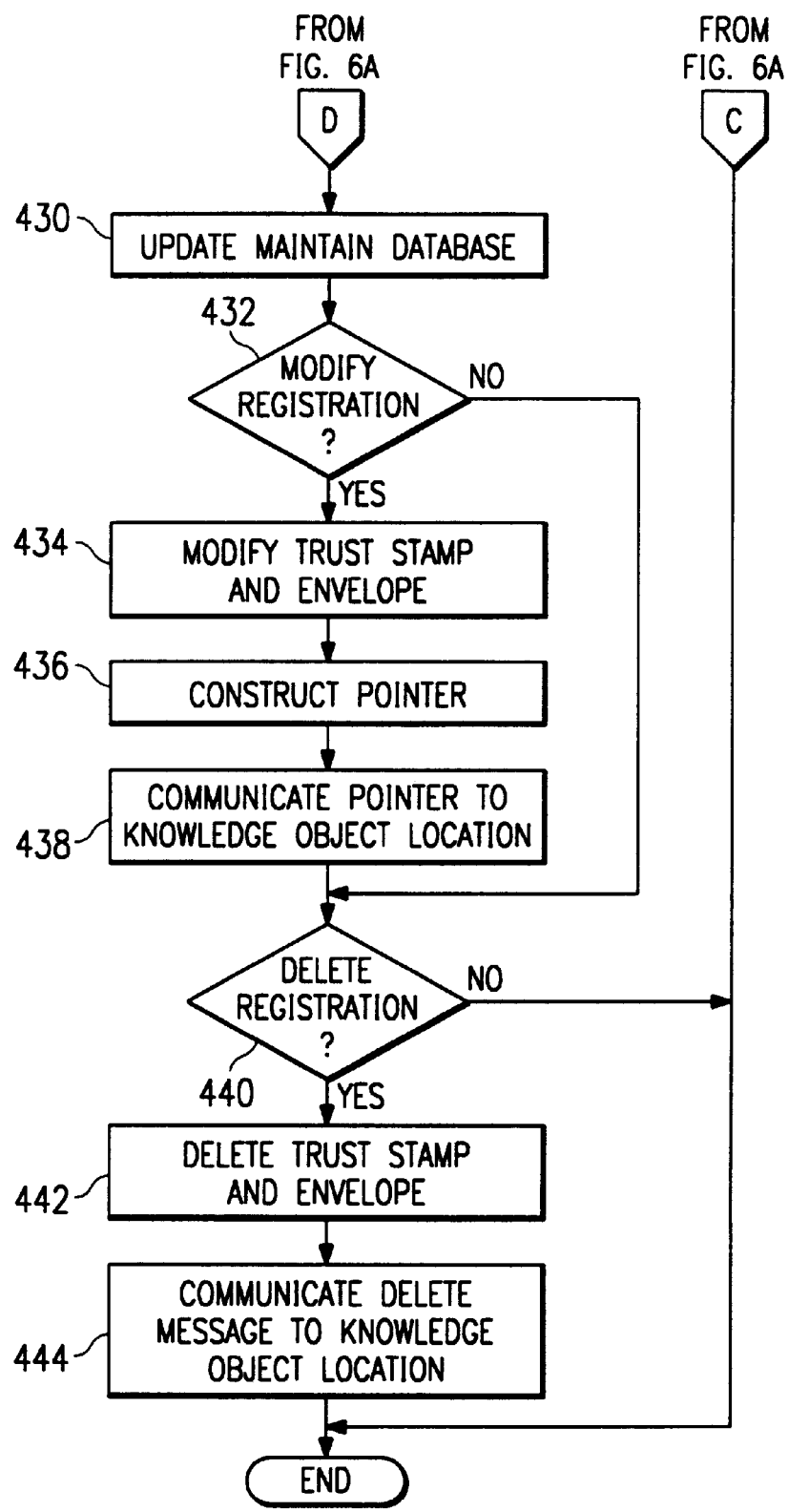

FIGS. 6A and 6B are a flowchart of a method of operation of maintain module 60 in server 12. As discussed above, maintain module 60 may incorporate a number of techniques to validate and verify the registration of knowledge object 22 in system 10. The method begins at step 400 where maintain module 60 selects the maintain mode for knowledge object 22. In this particular example, maintain module 60 may select a link check, owner check, or trigger check. However, maintain module 60 contemplates any other number of techniques for validating and verifying the proper registration of knowledge object 22 in system 10.

To perform a link check, maintain module 60 first accesses knowledge object 22 by using a link, URL, or other address maintained in knowledge object information 106 in envelope 50 at step 402. This may be done, for example, using a browser or other program to access knowledge object 22 using communication link 30 and the specified URL. If server 12 is unable to establish a link to knowledge object 22 at step 404, maintain module 60 may schedule to perform another link check at a later time at step 406. Maintain module 60 may attempt to access knowledge object 22 for a predetermined number of times, after which maintain module 60 may remove the registration of knowledge object 22 by deleting its associated trust stamp 46 and envelope 50. If server 12 establishes a link to knowledge object 22, maintain module 60 receives the last update information from knowledge object 22 at step 408. Maintain module 60 may use this information later to update envelope 50, generate a triggering event, or both.

To perform an owner check, maintain module 60 accesses owner database 66 at step 410. In a particular embodiment, maintain module 60 accesses change records from owner database 66 to determine if any information has changed for owners associated with registered knowledge objects 22. If changes retrieved from owner database 66 are not associated with registered owners at step 412, the method ends. However, if these changes are associated with a registered owner at step 412, maintain module 60 generates a message for delivery to the new location or address of the owner, the old location or address of the owner, or both at step 414. This message may include one or more URLs associated with knowledge objects 22 registered to the owner and a request to confirm the registration status of these knowledge objects 22. Maintain module 60 may then log the request for confirmation and await reception of response at step 416.

To perform a trigger check, maintain module 60 accesses maintain database 64, envelope 50, an internal clock or timer, or other information to determine a triggering event at step 418. If no triggering event occurs at step 420, the method ends. However if a triggering event occurs at step 420, maintain module 60 generates a message for delivery to the registered owner or appropriate reviewer to assess the current registration of knowledge object 22 at step 422. As discussed above, triggering events may include scheduled reviews after a predetermined period of time. Server 12 may also generate triggering events in response to feedback from users that access knowledge object 22, the number of updates of knowledge object 22, the number of accesses to knowledge object 22, or other criteria. After some period of time, maintain module 60 receives the response at step 424.

Using a link check (steps 402 to 408), an owner check (steps 410 to 416), or a trigger check (steps 418 to 424), maintain module 60 updates maintain database 64 with appropriate information at step 430. Maintain module 60 then determines based on the success of link check or based on the responses received during owner check or trigger check to modify the registration of knowledge object 22 at step 432. If appropriate, maintain module 60 modifies trust stamp 46 and envelope 50 at step 434. If necessary, server 12 constructs a new pointer 56 at step 436 and communicates pointer 56 to the location of knowledge object 22 at step 438.

Maintain module 60 may delete registration of knowledge object 22 at step 440 in response to, for example, a failed series of link checks or a negative or belated response from an owner or reviewer. If appropriate, maintain module 60 deletes trust stamp 46 and envelope 50 at step 442 and communicates a delete message to the location of knowledge object 22 at step 444. The delete message communicated by server 12 at step 444 may include self-executing code that automatically deletes pointer 56 in knowledge object 22.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An apparatus for registering a knowledge object, comprising:
   a first memory operable to store a trust stamp specifying one of a plurality of levels of confidence in the object;
   a second memory operable to store an envelope specifying a location of the object; and
   a construct module coupled to the first memory and the second memory, the construct module operable to generate a pointer to be delivered to the location of the object, the pointer comprising a first address specifying the trust stamp and a second address specifying the envelope.

2. The apparatus of claim 1, further comprising a communication module operable to communicate, to the location of the object, the pointer and a self-executing program operable to insert the pointer into the object.

3. The apparatus of claim 1, further comprising a receive module operable to receive a request from a client to register the object, the request comprising a first portion generated at the client, the receive module further operable to specify a second portion identifying the client.

4. The apparatus of claim 1, wherein the levels of confidence in the object comprise:

a first level corresponding to a first color; and a second level corresponding to a second color.

5. The apparatus of claim 1, wherein the first address comprises an image source code operable to cause display of an image associated with one of the levels of confidence in the object.

6. The apparatus of claim 1, wherein:

the first address comprises an image source code operable to cause display of an image associated with one of the levels of confidence in the object; and the second address comprises a link operable to cause display of the envelope in response to selection of the image.

7. The apparatus of claim 1, further comprising a maintain module operable to receive information from a third memory specifying a change in information on an owner of the object, the maintain module operable to generate a confirmation message for delivery to the owner.

8. The apparatus of claim 1, further comprising a maintain module operable to generate a confirmation message for delivery to an owner of the object upon expiration of a predetermined period of time.

9. A method performed on a computer for registering a knowledge object, the method comprising:

storing a trust stamp specifying one of a plurality of levels of confidence in the object;

storing an envelope specifying a location of the object; and generating a pointer to be delivered to the location of the object, the pointer comprising a first address specifying the trust stamp and a second address specifying the envelope.

10. The method of claim 9, further comprising the step of communicating, to the location of the object, the pointer and a self-executing program operable to insert the pointer into the object.

11. The method of claim 9, further comprising:

receiving a request from a client to register the object, the request comprising a first portion generated at the client; and specifying a second portion identifying the client.

12. The method of claim 9, wherein the levels of confidence in the object comprise:

a first level corresponding to a first color; and a second level corresponding to a second color.

13. The method of claim 9, wherein the first address comprises an image source code operable to cause display of an image associated with one of the levels of confidence in the object.

14. The method of claim 9, wherein:

the first address comprises an image source code operable to cause display of an image associated with one of the levels of confidence in the object; and the second address comprises a link operable to cause display of the envelope in response to selection of the image.

15. The method of claim 9, further comprising:

receiving information from a third memory specifying a change in information on an owner of the object; and generating a confirmation message for delivery to the owner.

16. The method of claim 9, further comprising the step of generating a confirmation message for delivery to an owner of the object upon expiration of a predetermined period of time.

17. A method performed on a computer for registering a knowledge object, comprising:

storing a trust stamp as an image source code that specifies one of a plurality of levels of confidence in the object;

storing an envelope specifying a URL address and an owner of the object; and generating a pointer to be delivered to the location of the object, the pointer comprising the image source code operable to cause display of an image associated with one of the levels of confidence in the object, the pointer further comprising the URL address operable to cause display of the envelope in response to selection of the image.

18. The method of claim 17, further comprising the step of communicating, to the location of the object, the pointer and a self-executing program operable to insert the pointer into the object.

19. The method of claim 18, wherein the pointer and the self-executing program comprise a JAVA applet.

20. The method of claim 17, wherein the levels of confidence in the object comprise:

a gold level;

a silver level associated with a knowledge caveat; and a registered level.

* * * * *